US011816715B2

(12) United States Patent
Nasle et al.

(10) Patent No.: US 11,816,715 B2
(45) Date of Patent: Nov. 14, 2023

(54) CLOUD COMPUTING SMART SOLAR CONFIGURATOR

(71) Applicant: Xendee Corporation, San Diego, CA (US)

(72) Inventors: Adib Nasle, Poway, CA (US); Scott K. Mitchell, San Diego, CA (US); Michael Stadler, Encinitas, CA (US)

(73) Assignee: Xendee Corporation, San Diego, CA (US)

(*) Notice: Subject to any disclaimer, the term of this patent is extended or adjusted under 35 U.S.C. 154(b) by 0 days.

(21) Appl. No.: 17/099,176

(22) Filed: Nov. 16, 2020

(65) Prior Publication Data

US 2021/0174416 A1    Jun. 10, 2021

Related U.S. Application Data

(63) Continuation of application No. 15/896,897, filed on Feb. 14, 2018, now Pat. No. 10,839,436.

(60) Provisional application No. 62/459,277, filed on Feb. 15, 2017.

(51) Int. Cl.
*G06Q 30/00* (2023.01)
*G06Q 30/0601* (2023.01)
*G06Q 50/06* (2012.01)
*G06Q 10/067* (2023.01)

(52) U.S. Cl.
CPC ....... *G06Q 30/0611* (2013.01); *G06Q 10/067* (2013.01); *G06Q 30/0623* (2013.01); *G06Q 30/0641* (2013.01); *G06Q 50/06* (2013.01); *H02J 2203/20* (2020.01)

(58) Field of Classification Search
None
See application file for complete search history.

(56) References Cited

U.S. PATENT DOCUMENTS

| | | | |
|---|---|---|---|
| 9,300,141 B2 | 3/2016 | Marhoefer | |
| 9,934,334 B2* | 4/2018 | Pryor | G06Q 50/16 |
| 10,025,337 B2* | 7/2018 | Hancock | G06Q 50/06 |
| 10,277,034 B2 | 4/2019 | Marhoefer | |
| 10,289,757 B2 | 5/2019 | McClure | |
| 10,373,085 B1 | 8/2019 | Baghdikian | |
| 10,592,833 B2* | 3/2020 | Fife | H02J 13/0079 |
| 10,839,436 B2 | 11/2020 | Nasle | |
| 2007/0203860 A1 | 8/2007 | Golden et al. | |
| 2009/0234692 A1 | 9/2009 | Powell et al. | |
| 2010/0217724 A1 | 8/2010 | Wayne et al. | |
| 2012/0303170 A1 | 11/2012 | Tomita et al. | |
| 2012/0330759 A1 | 12/2012 | Aggarwal et al. | |
| 2013/0103440 A1 | 4/2013 | Imani et al. | |
| 2013/0158954 A1 | 6/2013 | Wayne et al. | |

(Continued)

OTHER PUBLICATIONS

Sohaib Nasr Mohamed Abdalla et al. "Design and simulation of a 1-GWp solar photovoltaic power station in Sudan" Clean Energy, 2021, 57-78 (Year: 2021).*

(Continued)

*Primary Examiner* — Naeem U Haq
(74) *Attorney, Agent, or Firm* — Fish & Richardson P.C.

(57) ABSTRACT

Systems, methods and non-transitory computer-readable storage mediums are disclosed for cloud computing engineering, solar PV (SPV) or solar PV with storage (SPV/S) system configuration, pricing, quoting, advertising messaging, sales lead generation, and content marketing.

17 Claims, 5 Drawing Sheets

(56) References Cited

U.S. PATENT DOCUMENTS

| | | |
|---|---|---|
| 2013/0166211 A1 | 6/2013 | Kerrigan et al. |
| 2013/0246010 A1 | 9/2013 | Dershowitz et al. |
| 2014/0005845 A1 | 1/2014 | Thomas et al. |
| 2014/0130840 A1 | 5/2014 | Hinners et al. |
| 2014/0149081 A1 | 5/2014 | Hinners et al. |
| 2014/0289168 A1 | 9/2014 | Wayne et al. |
| 2014/0324535 A1 | 10/2014 | Chen |
| 2015/0066442 A1 | 3/2015 | Pryor |
| 2015/0088682 A1 | 3/2015 | Wayne et al. |
| 2015/0331972 A1* | 11/2015 | McClure ............... G06F 17/11 703/2 |
| 2017/0077701 A1 | 3/2017 | Meier |
| 2017/0140077 A1* | 5/2017 | Lin ....................... H02S 50/00 |
| 2018/0158152 A1* | 6/2018 | Jereminov .............. H02J 3/16 |
| 2018/0365746 A1 | 12/2018 | Nasle |

OTHER PUBLICATIONS

Paul Gilman "Solar Advisor Model User Guide for Version 2.0" National Renewable Energy Laboratory, Technical Report NREL/TP-670-43704 (Year: 2008).

Petru Claudiu Pase "Software solution design for photovoltaic solar applications" Procedia Technology 19 (2015) 695-702 (Year: 2015).

Introduction to E-commerce, Qin, Jun. 2009, 527 pages.

\* cited by examiner

CLOUD COMPUTING SMART SOLAR CONFIGURATOR

CROSS-REFERENCE TO RELATED APPLICATIONS

This application is a continuation of U.S. application Ser. No. 15/896,897, filed Feb. 14, 2018, which claims priority to U.S. Application Ser. No. 62/459,277, filed on Feb. 15, 2017.

TECHNICAL FIELD

The subject matter of this application relates generally to cloud computing applications.

BACKGROUND

Customer acquisition costs are extremely high for the solar photovoltaics (PV) industry. That is, current methods and technologies have failed to efficiently identify and target customers, and new customer groups are not being sufficiently enabled (e.g., community solar). Moreover, salespeople are not effectively educating people about the opportunity or the opportunity is not compelling enough, and this cumbersome and confusing process is resulting in lost sales. For ubiquitous solar to be achieved, new low cost methods of identifying, educating, and selling to millions of customers will need to be developed for residential, mid and large-scale solar installations, and customers that range from individuals, to non-profits, to major corporations.

For the solar PV industry, the cost of customer acquisition continues to rise as the market moves beyond early adopters. The cost and length of customer acquisition are increasing as fewer early mover customers remain, and this challenge is limiting growth. Existing technologies and methods to improve market transparency and the consumer experience have been inadequate, and aggressive marketing practices by the solar industry continue as current methods are failing at both providing viable leads to dealers and at empowering consumers with the tools they need to make informed choices.

Existing solar PV marketing solutions and match-making platforms rely on simple algorithms that can at best present very generic system recommendations with wildly varying costs that only serve to create more consumer confusion and skepticism. In fact, current state-of-the-art platforms simply facilitate installer bids for consumers to choose from. Such methods are not working.

Other popular solar PV system sizing solutions are geared toward off-line studies for researchers and energy economics experts, and offer no bill of materials (BOM) or detailed engineering evaluation capabilities, and other applications while providing greater accuracy in technical evaluation and costs, are not coupled to local load or rate data to expedite user evaluation.

Some of the challenge is that solar PV model, size and configuration outputs depend on user inputs, and such inputs may be unknown to the user, particularly if that person is a ratepayer seeking to install solar. Attempts to mitigate this challenge by current solar PV evaluation services have had poor results. That is, the consumer solar PV sales experience needs to deliver the same transparency today's PC, laptop, and car buying experience offers consumers, and avoid the opaqueness of the bid facilitating purchasing process, such as Expedia™, where customers have no idea what the person next to them has paid for the same airline seat.

Today's solar PV system customer acquisition methods continue to offer minimal pricing transparency. This places the solar PV developer in control of the discussion (and often the decision) for system configuration design and sizing. Indeed, the distance separating the ratepayer from the electric power utility (or technology vendor) facilitates a space for solar PV developers to push certain packages out of economic self-interest without disclosing all options to the ratepayer that may have improved performance or economics.

Requiring solar PV shoppers to rely on the very same salespeople they distrust for information on such large purchase decisions is an untenable situation if the solar PV industry is to grow past early adopters toward ubiquity.

Consumers are seeking solutions to simplify the solar-buying experience, and to achieve confidence in the prices they are quoted by installers. The need to eliminate the hassles of the solar-buying experience in the same manner TrueCar™ and Kelly Blue Book™ have for the car buying experience is one of the key innovations needed to achieve ubiquitous solar PV energy.

BRIEF DESCRIPTION OF THE DRAWINGS

Features, aspects, and embodiments are described in conjunction with the attached drawings.

Figure 1:
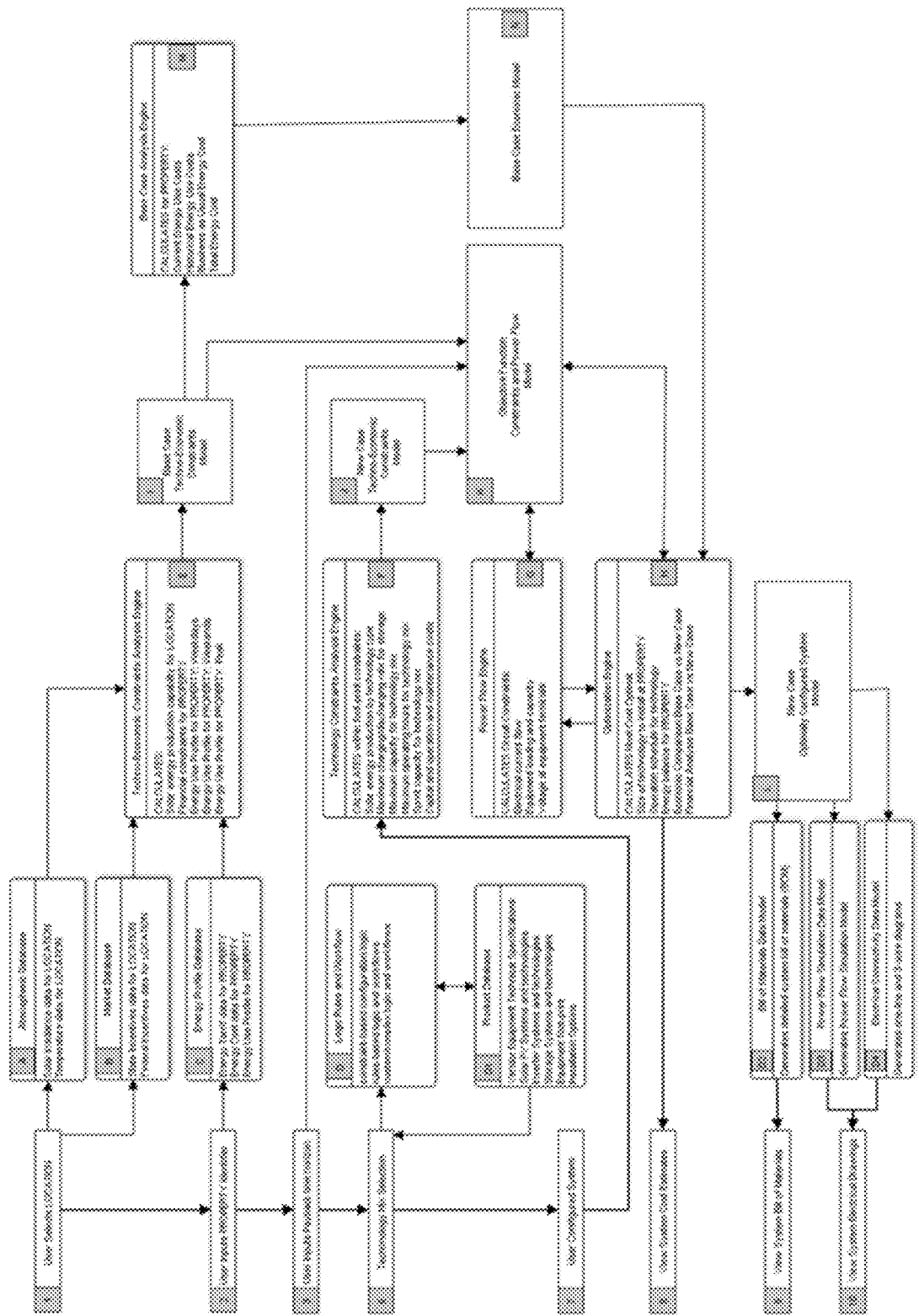
FIG. 1 is an illustration of an example Smart Solar Configurator logic flow in accordance with an embodiment.
Figure 2:
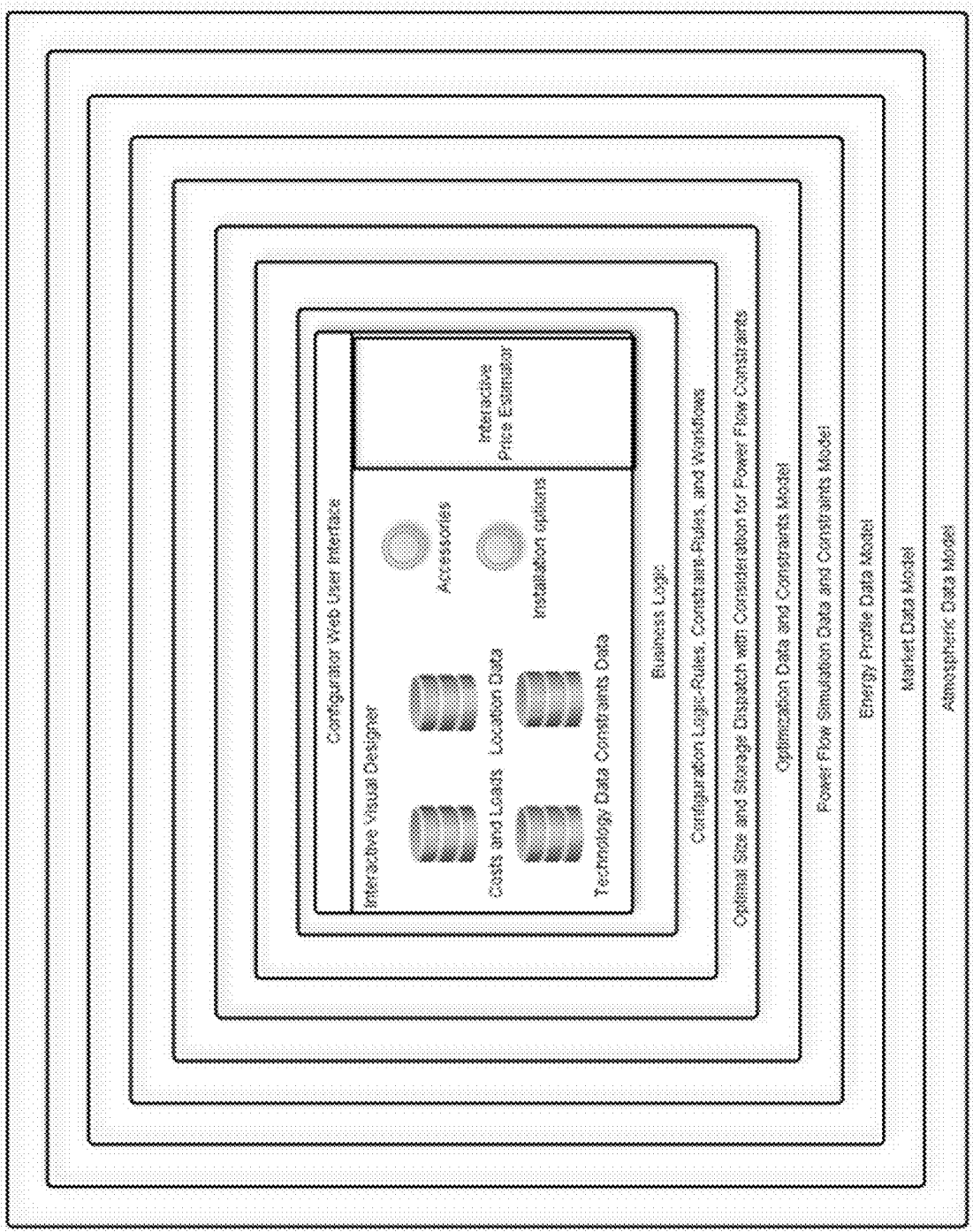
FIG. 2 is an illustration of example business logic, data models, and optimization and simulation analytics informing the configurator user interface described in FIG. 1, in accordance with an embodiment.
Figure 3:
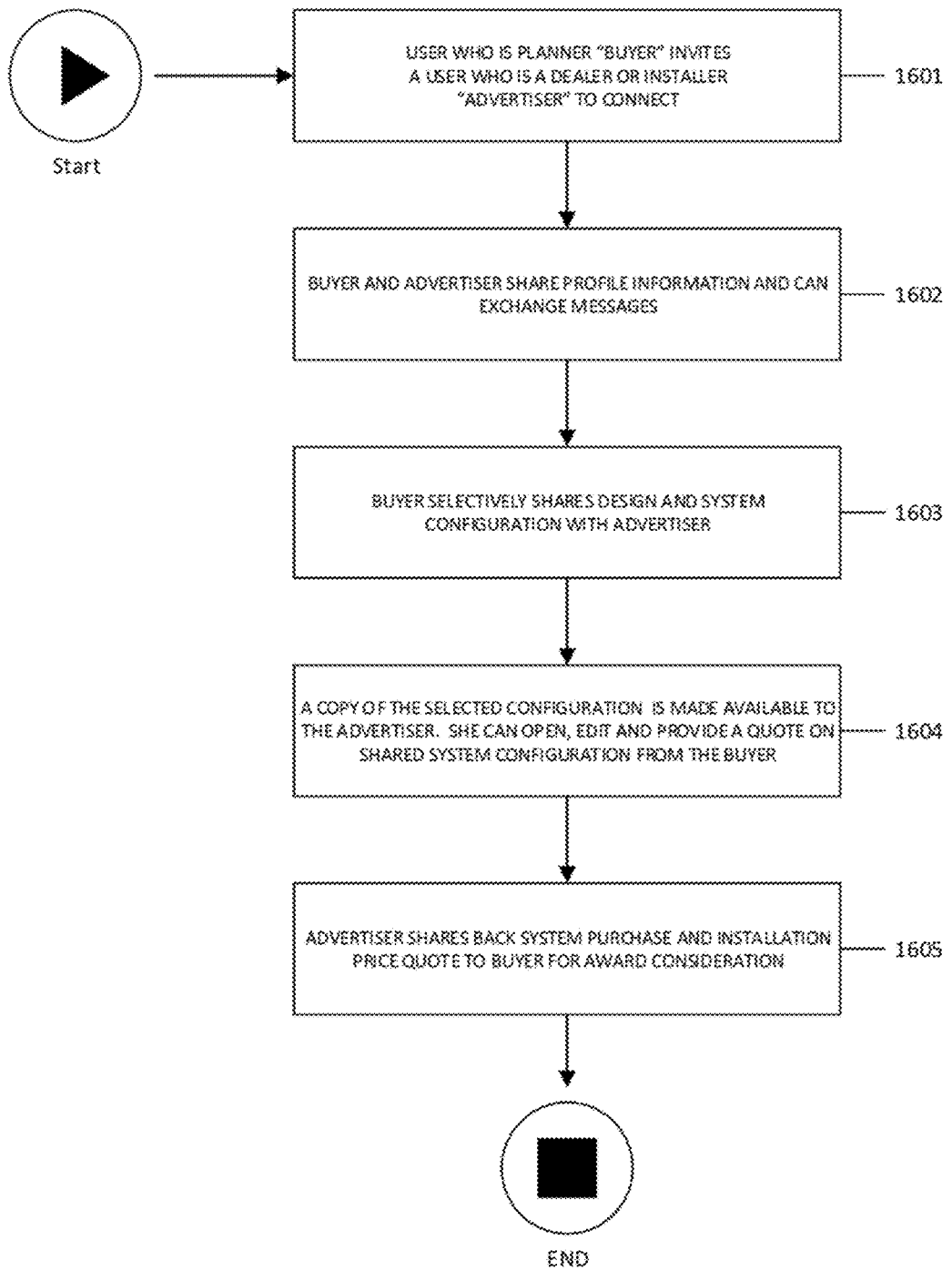
FIG. 3 is an illustration of a flowchart describing an example method for advertising messaging that is based on value added collaboration between a solar PV system dealer or installer (advertiser) and a solar PV system planner (buyer) in order to create a new lead generation advertising model and quoting by advertiser on system(s) configured by buyer in accordance with an embodiment.
Figure 4:
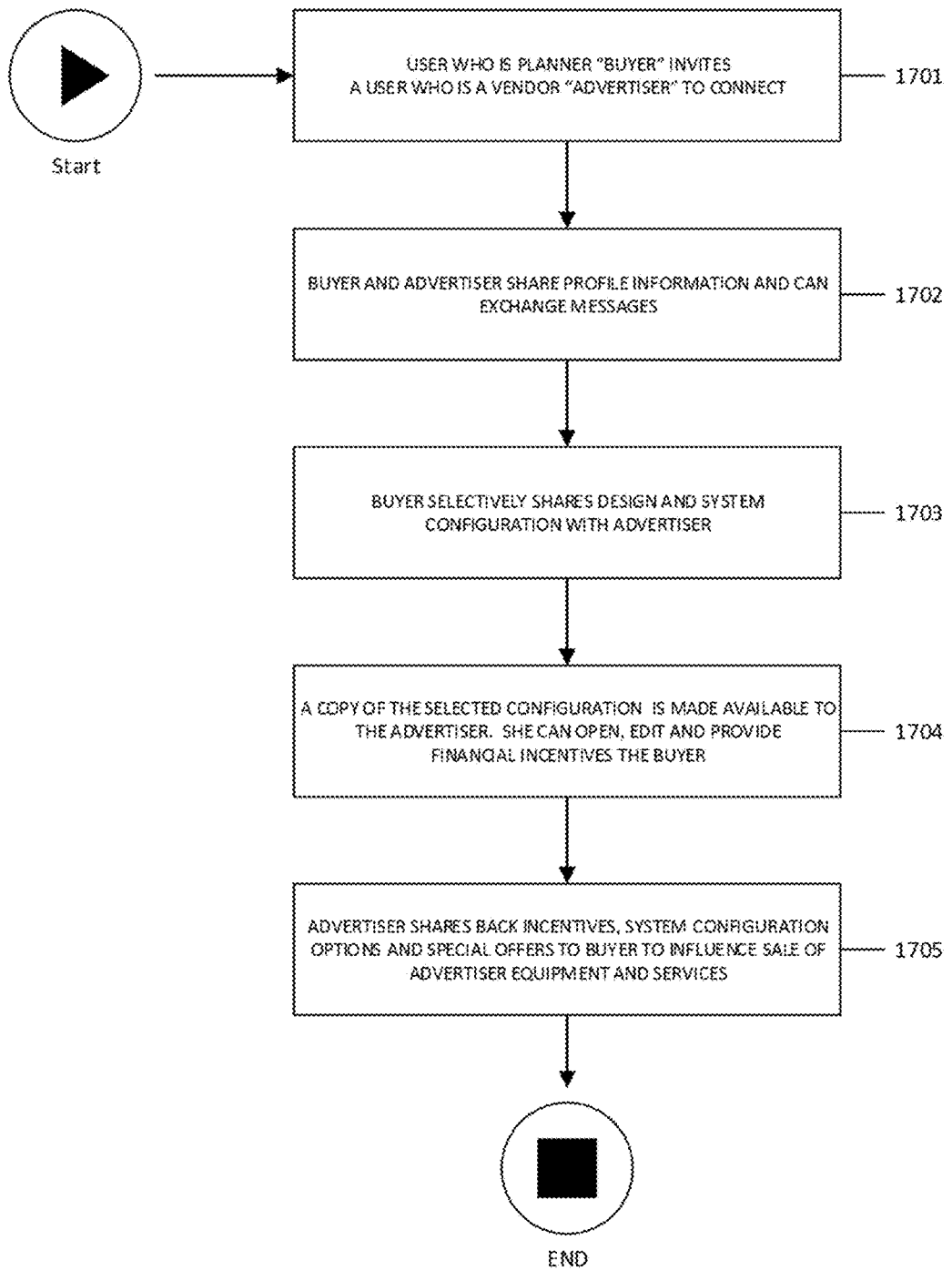
FIG. 4 is an illustration of a flowchart describing an example method for advertising messaging that is based on value added collaboration between a vendor (advertiser) and a solar PV planner (buyer) in order to create a new "advice" model advertising and direct marketing of incentives in accordance with an embodiment.

For a more complete understanding of the principles disclosed herein, and the advantages thereof, reference is now made to the following descriptions taken in conjunction with the accompanying drawings.

DESCRIPTION

Systems, methods and non-transitory computer-readable storage mediums are disclosed for cloud computing engineering, virtual solar PV (SPV) or solar PV with storage (SPV/S) system configuration, pricing, quoting, advertising messaging, sales lead generation, and content marketing.

According to one aspect, a method to automatically configure virtual SPV or SPV/S systems for residential and commercial applications comprises: a time-series (e.g., 1 year at 1 minute resolution) power flow circuit model and simulator, snap-shot (single time-step) power flow circuit model and simulator, economic optimization solver, physically-based economic optimization model, business logic, interactive 2-dimensional (2D) or three-dimensional (3D) product configurator and visualization, logic rules and workflows, techno-economic data models, SPV/S technology vendor catalog database, market tariffs and incentives database, property electrical energy consumption data, and location atmospheric data.

In some implementations, a method comprises: displaying, by a computing device, a user interface for the user configuration, pricing and quoting of a virtual SPV or SPV/S system for a computer analysis of a virtual SPV or SPV/S; receiving, by the user interface element, user selection of Objective Function, Constraints, Location, Technologies, Costs, and Loads.

According to one aspect, the Objective Function can be energy cost minimization such that: A) energy balance is preserved (e.g. energy supply=energy demand), B) technologies operate within physical boundaries (e.g. power output<=max output), and C) financial constraints are verified (e.g. savings obtained by use of the new virtual SPV or SPV/S must generate savings that repay investments within the user defined maximum payback period).

According to another aspect, the Objective Function can be Carbon Dioxide emission minimization such that: A) energy balance is preserved (e.g. energy supply=energy demand), B) technologies operate within physical boundaries (e.g. power output<=max output), and C) financial constraints are verified (e.g. savings obtained by use of the new virtual SPV or SPV/S must generate Carbon Dioxide emission savings that repay investments within the user defined maximum payback period).

According to one aspect, the Constraints can be financial boundaries such as the user's desired maximum payback period or investment time horizon.

According to another aspect, the Constraints can be physical boundaries such as the maximum rated electrical current (ampere) carrying capacity of cables, wires, transformers and other power delivery equipment that make up the electrical circuit the virtual SPV or SPV/S system will interconnect or integrate with.

According to another aspect, the Constraints can be operating boundaries calculated by power flow simulation such as energy losses and loading, or "hosting capacity" of existing cables, wires, transformers and other power delivery equipment that make up the electrical circuit the PVS/S system will interconnect or integrate with.

According to another aspect, the Constraints can be operating boundaries such as the allowable voltage drop at each node in the electrical network the virtual SPV or SPV/S system in two-dimensions or three-dimensions.

In some implementation, a method comprises: displaying, by a computing device, a user interface for electronic creation, configuration, simulation, optimization, management, pricing, quoting and displaying of a virtual SPV or SPV/S system via business logic, logic rules and workflows that help enhance application engagement, automate the selection and configuration process and minimize errors and illogical choices.

According to one aspect, the rules and workflows can be: rules-based logic, constraint-based logic, or scenario-based logic.

According to another aspect, a detailed bill of materials (BOM), which can include array, lines, disconnects, solar inverter, and racking styles is automatically generated for the configured PVS system.

According to another aspect, draft one-line or three-line electrical drawings are automatically generated based on the configured virtual SPV or SPV/S system and installation choices.

According to another aspect, a quasi-static time-series power flow simulation model of the configured SPV/S system is automatically generated.

According to another aspect, a static "snap-shot" power flow simulation model of the configured PVS/S system is automatically generated.

According to another aspect, a static "snap-shot" power flow simulation of the configured PVS/S system is performed to obtain power flow Constraints for physical and operational boundaries.

According to another aspect, time-varying or quasi-static time-series power flow simulation of the configured virtual SPV or SPV/S system is performed to obtain power flow Constraints for physical and operational boundaries for one year at various time step resolutions (e.g. every 15 minutes for 1 year or every 1 hour for 1 year). For example, for an annual simulation at 1-hour resolution, 8,760 time-steps are simulated and analyzed. The time-varying atmospheric data model, which includes annual solar irradiance and temperature data at certain time-steps (e.g. every hour of every day for a year), along with the solar PV technology performance, efficiency and power output ratings (Solar PV Panel DC Output Rating in Kilowatts (kW), Solar PV system inverter rating in Kilo-Volt-Amps (KVA), Solar PV Technology Power to Efficiency Curve, Solar PV Technology Temperature to and Power Curve provide the power flow simulation model for determining, via time-series power flow analysis, the electrical power output for the size of Solar PV technology being configured by the user.

According to another aspect, the optimization technique can be based on simulation model and method with: predefined set of rules with only one possible output per input. The objective is to find the optimal combination of technology to supply of all energy services required at the property under consideration, while optimizing the energy flows to minimize costs and/or CO2 emissions. The time-varying atmospheric data model, which includes annual solar irradiance and temperature data at certain time-steps (e.g. every hour of every day for a year), along with the solar PV technology performance, efficiency and power output ratings (Solar PV Panel DC Output Rating in Kilowatts (kW), Solar PV system inverter rating in Kilo volt amps (KVA), Solar PV Technology Power to Efficiency Curve, and Solar PV Technology Temperature to Power Curve) provide the simulation model required for determining the electrical power output for the size of solar PV technology being configured by the user at their property location. That is, solar panel temperature affects the power output potential of the solar PV system. Cold temperatures generate the most power output, while warmer temperatures produce less power output from solar PV technology. Moreover, the lower the power output from the solar PV panel, generally the less efficient it will operate. This data model, along with the Objective Function, Constraints data model, and Costs and Loads data model inform the optimization engine which then calculates the most cost-optimal size for the solar PV technology. This method provides rapid sizing optimization, but is limited in scope to solar PV technology and is unable to calculate storage system size and dispatch accurately.

According to another aspect, the optimization technique can be based on a physically-based economic optimization model and Mixed Integer Linear Program (MILP) method. The objective is to find the optimal combination of technology and operation schedule (dispatch) to supply of all energy services required at the property under consideration, while optimizing the energy flows to minimize costs and/or $CO_2$ emissions. The time-varying atmospheric data model, which includes annual solar irradiance and temperature data at certain time-steps (e.g. every hour of every day for a year), along with the solar PV technology performance, efficiency and power output ratings (Solar PV Panel DC Output Rating in Kilowatts (kW), Solar PV system inverter rating in Kilo-Volt-Amps (KVA), Solar PV Technology Power to Efficiency Curve, Solar PV Technology Temperature to and Power Curve) inform the power flow simulation model that is used to perform quasi-static time-series power flow analysis and calculate the electrical power output for the size of Solar PV technology being configured by the user. This data model, along with the Objective Function, Constraints data model, and Costs and Loads data model inform the MILP optimization engine which then calculates the most cost-optimal size for the solar PV with Storage technology selected.

Storage technologies can include lithium ion batteries, ice storage systems, flow batteries and other energy storage systems. If the user has selected SPV or SPV/S technology to configure, then the optimization engine calculates the most cost-optimal size for both solar PV and Storage, and also computes the operation logic (dispatch) for the storage technology. That is, the optimal size of solar PV and the optimal size of storage are calculated, along with the annual charging and discharging schedule for the storage system. The schedule to charge and discharge stored energy is referred to as the dispatch curve which is in Per Unit format, with 1.0 indicating 100% discharging state and −1.0 indicating 100% discharging state. This method provides high accuracy and requires additional computation time by the server due to the complexity of the problem space.

According to another aspect, a method for advertising messaging and lead generation can comprise of: a cloud computing Smart Solar Configurator that provides a user who is a buyer and a user who is an advertiser access to quoting and sales communications. The user who is a buyer can invite advertisers to offer quotes on her configured virtue SPV or SPV/S system. The buyer can also share configuration data, BOM, Costs, and Loads data with the advertisers and use analysis and simulation features to validate the benefits and value of any additions or modifications the advertisers recommend.

According to another aspect, a method for advertising and content marketing messaging and lead generation can comprise of: a cloud computing Smart Solar Configurator application that provides a user who is a buyer and a user who is a manufacturer access to sales and advertising communication. The user who is a manufacturer can offer targeted incentives to the buyer during the virtual SPV or SPV/S configuration process to influence purchase decisions. The buyer can also share configuration, BOM, Costs and Load data with the manufacturer to get advice on options and technologies. The manufacturer can communicate product differentiation and demonstrate benefits collaboratively with the buyer.

In some implementations, a method comprises: providing, by a server computer, an interactive Smart Solar Configurator, pricing and quoting environment for selecting, analyzing and simulating a virtual SPV or SPV/S system; providing, by the server computer, a collaborative interface in the interactive configurator environment for allowing users to share a configuration, the collaborative interface configured to allow the users access, using client devices in communication with the server device, a copy of a shared configuration maintained by the server device, and to edit the shared configuration; and providing, by the server computer, user interface elements that are selectable by the users on their respective client devices to perform an analysis or simulation of the shared configuration and share the results of the analysis or simulation in the collaborative interface.

Example Server Architecture

Figure 5:
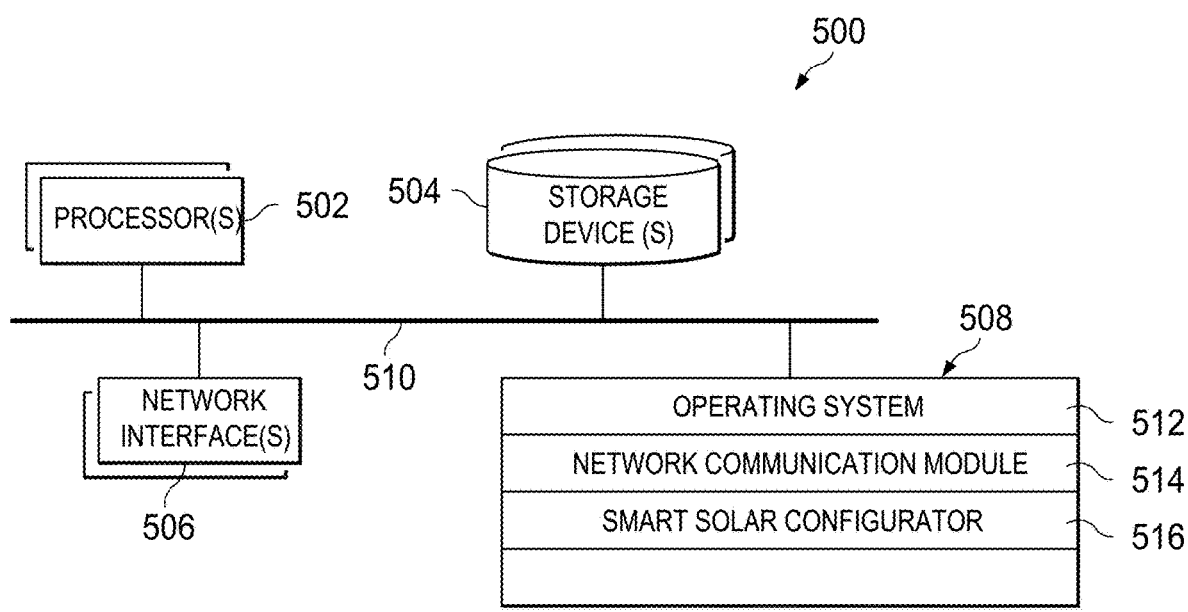
FIG. 5 is a block diagram of example computer architecture for implementing the features and processes described in reference to FIGS. 1-4, according to an embodiment.

FIG. 5 is a block diagram of example computer architecture for implementing the features and processes described in reference to FIGS. 1-4, according to an embodiment. Other architectures are possible, including architectures with more or fewer components. In some implementations, architecture 500 includes one or more processor(s) 502 (e.g., dual-core Intel® Xeon® Processors), one or more network interface(s) 506, one or more storage device(s) 504 (e.g., hard disk, optical disk, flash memory) and one or more computer-readable medium(s) 508 (e.g., hard disk, optical disk, flash memory, etc.). These components can exchange communications and data over one or more communication channel(s) 510 (e.g., buses), which can utilize various hardware and software for facilitating the transfer of data and control signals between components.

The term "computer-readable medium" refers to any medium that participates in providing instructions to processor(s) 502 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 508 can further include operating system instructions 512 (e.g., Mac OS® server, Windows® NT server), network communication module instructions 514 and smart solar configurator instructions 516 for implementing the features and process described in reference to FIGS. 1-4.

Operating system 512 can be multi-user, multiprocessing, multitasking, multithreading, real time, etc. Operating system 512 performs basic tasks, including but not limited to: recognizing input from and providing output to devices 502, 504, 506 and 508; keeping track and managing files and directories on computer-readable medium(s) 508 (e.g., memory or a storage device); controlling peripheral devices; and managing traffic on the one or more communication channel(s) 510. Network communications module 514 includes various components for establishing and maintaining network connections (e.g., software for implementing communication protocols, such as TCP/IP, HTTP, etc.).

Architecture 500 can be included in any computer device, including one or more server computers in a local or distributed network each having one or more processing cores. Architecture 500 can be implemented in a parallel processing or peer-to-peer infrastructure or on a single device with one or more processors. Software can include multiple software components or can be a single body of code.

Particular implementations disclosed herein provide one or more of the following advantages. A cloud computing Smart Solar Configurator provides a key innovation toward addressing customer acquisition costs for the solar industry by integrating capabilities never before combined, and delivering them via an engaging on-line experience that informs and creates consumer excitement without complexity. The Smart Solar Configurator leverages multiple existing data sources, coupled with SPV and SPV/S economic optimization and sizing analytics (typically inaccessible by non-power system engineering experts) to deliver a first-of-a-kind "Smart Solar Configurator" that enables the general public and solar shoppers from all backgrounds with the tools they need to automatically determine the most optimal SPV or SPV/S system size for their home or business, along with an interactive configurator that gives them the freedom to explore, and choose options and accessories that are compatible with the make, model and size of system they wish to purchase.

Just as consumers can easily research, explore, and configure options including accessories for cars, PCs, and laptops by make and model, with a cloud computing Smart Solar Configurator shoppers will, for the first time ever, have a similar product decision tool, powered by advanced simulation and DER sizing and optimization technologies, coupled with the information and pricing transparency they have become conditioned to and expect from durable consumer goods purchasing experiences.

Solar customers will be empowered with accurate upfront system cost estimates for an optimally sized PV system that will include a range of typical installation fees for the model and options selected, and see how different options and features impact their configured system pricing and return on investment time-line in real-time as they explore and configure systems—all before deciding to be contacted by an installer.

Solar installers and project developers operate in a highly competitive market in which access to customers and informed solar system pricing are essential to installer profitability. A cloud computing Smart Solar Configurator will benefit installers and dealers by attracting informed, in-market consumers in a cost-effective and accountable manner that helps them sell more solar systems profitably. Moreover, a cloud computing Smart Solar Configurator can increase the trust between installers and solar buyers, which will help dealers increase volume and reduce customer acquisition costs.

Solar equipment manufacturers benefit from a cloud computing Smart Solar Configurator by offering targeted incentives to consumers, allowing manufacturers to focus their customer acquisition efforts through a direct marketing channel. The ability to deliver focused incentives enables manufacturers to reach consumers that might otherwise purchase a solar system from a competing manufacturer.

A cloud computing Smart Solar Configurator addresses concerns for electrical utility distribution system planners with determining the impact of residential and non-residential PV on the macro-grid. This can include feeder hosting capacity to more detailed deep circuit power flow studies. A cloud computing Smart Solar Configurator delivers to utilities an open-source data package that includes all the information necessary for system planners to update their circuit models and achieve a more efficient interconnection and permitting process.

The features described herein may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    generating, by a computing device, a base case economic model for a virtual energy system, the base case economic model based at least in part on a location of the virtual energy system;
    generating, by the computing device, an objective function model and one or more constraints for the virtual energy system;
    calculating, by the computing device, a size of the virtual energy system that achieves an objective function described by the objective function model using the one or more constraints by comparing an economic model of the virtual energy system with the base case economic model, wherein the virtual energy system includes an optimal combination of technology and an operation schedule to supply energy services at the location, while optimizing energy flows to minimize costs and carbon dioxide emissions;
    performing, by the computing device, a power flow simulation of the virtual energy system based on the calculated size, a time-varying atmospheric data model, and photovoltaics (PV) technology performance, efficiency and power output ratings, where the power flow simulation performs quasi-static time-series power flow analysis and calculates electrical power output for the calculated size of the virtual energy system;
    generating, by the computing device, a virtual energy system configuration based at least in part on results of the power flow simulation including the electrical power output for the calculated size of the virtual energy system; and
    generating, by the computing device and based on the virtual energy system, data for building a real-world version of the virtual energy system.

2. The method of claim 1, wherein the virtual energy system is one of a virtual solar photovoltaics (SPV) system, solar photovoltaics with storage (SPV/S) system, or other distributed energy resources system.

3. The method of claim 1, wherein the objective function model comprises a data model, the one or more constraints technology purchase or energy costs and loads.

4. The method of claim 1, wherein the time-varying atmospheric data model includes future forecasted or annular solar irradiance, temperature data and efficiency and power output ratings for solar panels.

5. The method of claim 1, wherein the base case economic model is generated using energy purchased from an electrical utility to supply a load at rates or tariffs charged by the electric utility for the location of the virtual energy system.

6. The method of claim 1, wherein the objective function comprises at least one energy cost minimization, carbon dioxide emission minimization, resilience improvement, reliability improvement or redundancy improvement.

7. The method of claim 1, wherein the objective function model incorporates one or more technologies configured to operate within one or more physical operating boundaries and one or more financial constraints.

8. The method of claim 7, wherein the one or more physical operating boundaries include a maximum rated electrical current carrying capacity of power delivery equipment that make up an electrical circuit of the virtual energy system.

9. The method of claim 7, wherein the one or more physical operating boundaries are calculated by the power flow simulation and include at least one of power flow, transient stability, short circuit, energy losses or loading of power delivery equipment that make up an electrical circuit of the virtual energy system.

10. The method of claim 7, wherein the one or more physical operating boundaries include an allowable voltage drop, short circuit, harmonics, reliability, or transient stability at each node in an electrical network of the virtual energy system in two-dimensions or three-dimensions.

11. The method of claim 7, wherein the one or more financial constraints include a maximum payback period or investment time horizon.

12. The method of claim 1, wherein the data for building a real-world version of the virtual energy system includes a bill of materials (BOM).

13. The method of claim 1, further comprising:
    automatically generating one-line or three-line electrical drawings based on the virtual energy system design.

14. The method of claim 1, further comprising:
    automatically generating a static snap-shot, quasi-static, time-series, time-domain, or frequency domain power flow simulation model of the virtual energy system to obtain power system constraints for the one or more physical operating boundaries.

15. The method of claim 1, wherein the objective function comprises a combination of technologies to supply energy services required at the location and to minimize costs or carbon dioxide emissions, improve resilience, improve reliability or improve redundancy.

16. The method of claim 1, wherein the atmospheric data model includes solar irradiance, wind speed, and temperature data at specified time-steps.

17. The method of claim 1, further comprising:
    automatically generating a cost-optimal size for solar panels, storage technology or other distributed energy technologies; and
    automatically generating operation logic or dispatch for the storage technology or other distributed energy technologies.

* * * * *